Patented Oct. 24, 1950

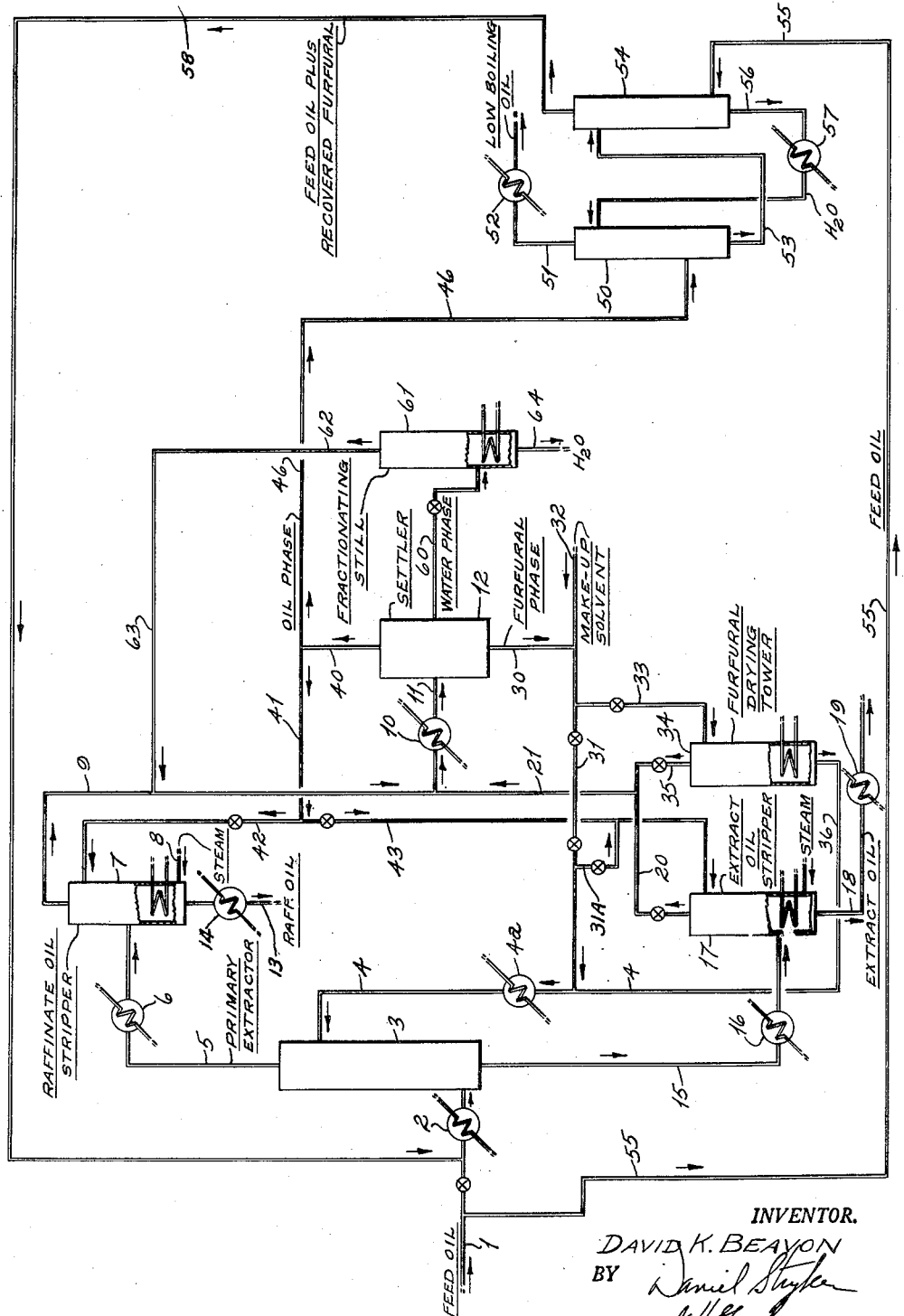

2,526,722

UNITED STATES PATENT OFFICE 2,526,722

SOLVENT REFINING OF LIGHT OILS

David K. Beavon, Long Beach, Calif., assignor to The Texas Company, New York, N. Y., a corporation of Delaware Application September 16, 1947, Serial No. 774,253

6 Claims. (Cl. 196—14.26)

This invention relates to a method of effecting extraction of oil with a solvent liquid which is at least partially miscible with water at ordinary temperatures and particularly relates to extraction of a feed oil of the character of kerosene and gas oil and containing constituents which boil below or at approximately the same temperature as the solvent, and thus are distilled with the solvent when it is stripped from the products.

The invention has particular application to the solvent refining of kerosene stock to produce oil of improved burning characteristics and also to the refining of gas oils for the production of Diesel oil.

In accordance with this invention, a feed oil such as kerosene or low boiling gas oil is extracted with a selective solvent such as furfural under conditions effective to form extract and raffinate phases. The raffinate phase comprises relatively paraffinic constituents of the oil, or constituents insoluble in the solvent under the conditions of extraction, mixed with a small proportion of solvent. The extract phase comprises the less paraffinic or more soluble constituents of the oil dissolved in the main body of solvent. The resulting phases are separately treated to distill solvent from the extract and raffinate oil. The resulting distillates containing both solvent and low-boiling oil are condensed and cooled. Water is added before, during or after distillation and the resulting condensates, advantageously in the presence of each other, are subjected to settling in a suitable quiescent zone. As a result of this cooling and settling, the condensed material separates into three single phases, i. e., a solvent-rich phase, an oil-rich phase and a water-rich phase, both the solvent-rich and the oil-rich phases containing a small amount of water. These three phases are separately withdrawn from the settling zone. All or a portion of this water-rich phase is passed to a fractionating zone, wherein a minimum boiling azeotrope of water and solvent is distilled from the water phase, and is recycled to the aforesaid settling zone, while the residual water is discharged from the fractionating zone.

The oil-rich phase comprises the aforesaid low-boiling constituents of the feed oil and contains usually about 5 to 10% by volume solvent and no more than a trace of water dissolved in the oil. These low-boiling constituents may boil in the range from substantially below to about 100° higher than the solvent. This oil phase is subjected to washing with a stream of water under conditions effective to preferentially dissolve the primary solvent and remove it from the oil. The resulting solution of solvent in water is separately contacted with a stream of feed oil under conditions effective to separate the solvent from the water and the resulting mixture of feed oil and primary solvent is conducted to the primary extraction zone.

The furfural-rich phase removed from the settling zone, and which is saturated with water may be returned to the primary extraction zone for use in extracting fresh feed oil. If desired, the withdrawn furfural phase may be subjected to a stripping or fractionating treatment in order to remove at least a portion of the water and oil associated with it, and the solvent from which water and oil have been removed then returned to the primary extraction zone.

The present invention thus involves subjecting a solvent-oil-water distillate mixture distilled from the raffinate and extract phases to a 3-phase separation, thereby obtaining an oil-rich phase consisting mainly of oil and a small amount of solvent, the latter usually amounting to about 5 to 10% by volume of the oil. The primary solvent is extracted from this oil-rich phase by washing with a liquid in which it is soluble in a manner designed to permit employment of a simplified solvent recovery operation with a minimum of fractional distillation.

In order to describe the invention, reference will now be made to the accompanying drawing which comprises a flow diagram of the process as applied to the treatment of gas oil, derived from the catalytic cracking of petroleum oil, for the production of Diesel fuel. The gas oil in question has an A. P. I. gravity of about 29 and a cetane number of about 34.

As indicated in the drawing, the feed oil is introduced from a source not shown through a pipe 1 and heat exchanger 2 to the lower portion of a primary extraction tower 3 of conventional type.

The feed oil rises upwardly through packing within the tower 3 countercurrently to a stream of solvent introduced to the upper portion of the tower through a pipe 4 to which reference will be made later. The solvent comprises furfural and may contain some water and oil as a result of previous use in the process. (Thus, it may contain about 3% water and 15% oil by volume.) However, substantially dry solvent is advantageous. The solvent is introduced to the upper portion of the column in the proportion of about one volume of solvent to two volumes of feed oil. The temperature of the entering streams of oil and solvent are regulated so that the temperature at the bottom of the extraction tower 3 is maintained at about 100° F. while the temperature at the top is maintained at about 80°–150° F.

Under these conditions, extract and raffinate phases form. The raffinate phase comprises oil of about 45 to 60 cetane number and amounting to from 60 to 80% by volume of the feed oil. The raffinate oil is mixed with a small portion of the solvent liquid and is continuously removed from the top of the extractor through a pipe 5 and heat exchanger 6. It is then introduced to a raffinate oil stripper 7 wherein solvent is distilled from the raffinate oil in the presence of water vapor. The stripper 7 may be provided with a reboiling element as indicated to facilitate distillation, and the distillation may be aided with open steam introduced to the lower portion of the stripper through a pipe 8.

The temperature at the bottom and top of the stripper 7 are respectively about 540° and 340° F., the top pressure being about 5 pounds gage. The bottom temperature will depend upon the feed stock. The resulting distillate comprises a mixture of furfural, water vapor and oil, the oil amounting to from 2½ to about 3½% basis the raffinate oil. This distillate is removed through a pipe 9 and conducted through a cooling and condensing exchanger 10. The resulting condensate is passed through pipe 11 to a settler 12. The raffinate oil from which the solvent has been stripped is discharged from the stripper through a pipe 13 and exchanger 14. It is characterized by having an A. P. I. gravity in the range of about 32 to 42 and a cetane number in the range of about 45 to 60.

The extract oil and solvent mixture are removed from the extractor through pipe 15 and exchanger 16 from which it passes to the extract stripper 17 for distillation of solvent from the extract oil. Solvent-free extract oil is discharged through pipe 18 and is characterized by having an A. P. I. gravity of about 10 to 12.

The resulting distillate removed from the top of the stripper 17 also comprises a mixture of furfural, water and oil. It is conducted through a pipe 20, and branch pipe 21 communicating with the previously mentioned pipe 9 leading to condenser 10 from which it passes through pipe 11 leading to the settler 12, which is maintained at about 70 to 100° F. Separation into three separate phases occurs, i. e., a furfural-rich phase, an oil-rich phase and a water-rich phase. The furfural-rich phase comprises furfural saturated with water in the amount of about 3% by volume. This furfural-rich phase is drawn off through a pipe 30 and branch pipe 31. From the pipe 31, the furfural-rich phase may be introduced to pipe 4 for return, after heating to the desired temperature in heat exchanger 4a, to the upper portion of the primary extractor 3. Any additional solvent required to make up for losses in the system may be added from a source not shown through pipe 32.

If desired, a portion of this furfural-rich phase may be diverted through pipe 31A for reflux to the stripper 17.

On the other hand, all or a portion of the furfural-rich phase flowing through pipe 31 may be diverted through pipe 33 for introduction to a drying tower 34, wherein the concentration of water may be further decreased prior to return to the primary extractor. In the tower 34, water, some furfural and low-boiling oil are removed as distillate through pipe 35 which connects with pipe 21 by which such distillate is returned to the settler 12.

The resulting furfural stream of decreased water content is removed from the bottom of the tower 34 through a pipe 36 communicating with pipe 4 for return to the primary extractor.

The tower 34 can thus be used to regulate the content of water in the total stream of furfural being returned to the primary extractor.

The oil-rich phase removed from the settler 12 usually comprises relatively paraffinic oil containing about 5 to 10% furfural and also retains a small amount of water. This oil-rich phase is continuously removed through pipe 40 and a portion thereof may be diverted through pipe 41 leading to branch pipes 42 and 43, respectively, from which it may be introduced as reflux liquid to the raffinate and extract oil strippers, respectively. The non-recycled portion of the oil-rich phase removed through pipe 40 is passed through pipe 46 leading to the lower portion of a wash extractor 50, wherein it is subjected to countercurrent contact with a stream of water at a temperature of about 100° F. such that the stream of water preferentially dissolves the residual furfural from the oil. The solvent-free oil is discharged through pipe 51 and exchanger 52. The resulting solution of primary solvent in water is conducted through pipe 53 to the upper portion of a wash stripper 54, wherein the aqueous solution of primary solvent is subjected to countercurrent contact with a stream of feed oil introduced to the lower portion of the stripper 54 through a pipe 55. This contact is made at a temperature of about 100° F., and the feed oil is introduced to the stripper 54 in the proportion of about 2–4 volumes of feed oil to 1 volume of water solution.

The water from which the furfural has been removed is drawn off through pipe 56 and exchanger 57 for return to the upper portion of the wash extractor 50.

The resulting solution of primary solvent in feed oil is removed through pipe 58 and conducted to the previously mentioned pipe 1 by which it is returned to the primary extractor.

The water-rich phase formed in the settler 12 is drawn off through pipe 60 and is introduced to a fractionator 61 wherein an azeotrope of water and furfural is distilled from the water phase. This distillate, comprising a mixture of about 33% furfural and 67% water by volume, is removed through pipe 62 and discharged into pipe 63 for return to the settler 12. Water substantially free from furfural is discharged from the fractionator 61 through pipe 64. The fractionator 61 may be provided with a reboiling element as indicated, and provision may be made for the introduction of live steam to facilitate distillation therein.

While the treatment of a gas oil produced by catalytic cracking has been specifically referred to in connection with the drawing, nevertheless, it should be understood that the process is applicable to the treatment of other types of gas oils and also to the treatment of kerosene, as well as to various fractions thereof. In general, it has application to the treatment of hydrocarbous mixtures boiling within the range of about 300 to 800° F.

Specific conditions of temperature and solvent dosage may vary from those specifically mentioned, depending upon the character of the feed oil undergoing treatment and upon the degree of fractional separation desired in the primary extractor.

The invention is particularly concerned with the use of organic solvent liquids which are relatively high boiling, and which are miscible at least to some extent with water, and with which some constituents of the oil feed are co-boiling. Selective solvents other than furfural may be used. These may include other derivatives of the furan group, and other aldehydes such as benzaldehyde, nitrobenzene and ketones such as aliphatic ketones may be used.

It is contemplated that besides water, other secondary solvents may be used for recovery of residual primary solvents from the oil-rich phase.

It is also contemplated that the invention may have application to the treatment of oils other than those derived from a mineral source, and which contain co-boiling constituents. For example, the invention may be useful in the treatment of oil such as derived from vegetable and animal sources.

It is contemplated that certain of the extraction or washing operations may be effected in the presence of a wetting agent. For example, the washing of furfural from the oil-rich phase with water in the wash extractor 50 may be effected in the presence of a small amount of a suitable wetting agent, such as sodium lauryl sulfonate. Examples of suitable wetting agents other than the sulfonate compound previously mentioned are fatty acid soaps, alkylated cellulose, polyhydric alcohols, starch, etc.

It is also contemplated that it may be advantageous to effect distillation of furfural in the presence of an agent capable of inhibiting reaction between furfural and constituents in the oil and thus avoid degradation and loss of furfural under the conditions of temperature prevailing in the strippers. Triethanolamine is an example of a suitable inhibitor that might be used although other amine-containing compounds such as N-phenyl, substituted guanadines, naphthylamines and thioureas may be used.

Obviously, many modifications and variations of the invention as above set forth may be made without departing from the spirit and scope thereof, and only such limitations should be imposed as are indicated in the appended claims.

I claim:

1. In the solvent separation of oil of the character of kerosene and light gas oil containing some constituents which are co-boiling with the solvent, the method which comprises subjecting said feed oil to extractive contact with a water miscible organic solvent liquid in an extraction zone under predetermined conditions of temperature and solvent dosage, forming a raffinate phase comprising undissolved feed oil constituents mixed with a minor portion of said solvent and an extract phase comprising soluble oil constituents dissolved in a major portion of said solvent, separately removing said phases from the extraction zone, separately distilling solvent and co-boiling oil constituents from said raffinate and extract phases in separate primary fractionating zones in the presence of water vapor, commingling resulting primary distillates with a water-solvent azeotrope mixture recycled from a succeeding step later referred to, passing the commingled mixture to a settling zone maintained under liquid phase conditions and such that there is no substantial vaporization of water, forming in said settling zone an oil-rich layer containing a small amount of solvent, a water-rich layer containing a small amount of solvent and a solvent-rich layer containing a small amount of water, separately withdrawing liquid from each of said layers, passing withdrawn water-rich liquid to a secondary fractionating zone, distilling from said water-rich liquid a water-solvent azeotrope mixture, recycling said azeotrope mixture for the aforesaid commingling with the primary distillates, recycling portions of withdrawn oil-rich liquid as reflux to said primary fractionating zones, extracting residual solvent from remaining withdrawn oil-rich liquid, recycling so recovered residual solvent to the extraction zone, passing at least a portion of said solvent-rich liquid to a tertiary fractionating zone, distilling from said tertiary zone an aqueous distillate containing water and solvent leaving a residual solvent liquid, recycling said residual solvent liquid to the extraction zone, and passing said tertiary distillate to said settling zone.

2. The method according to claim 1 in which the solvent liquid comprises furfural.

3. The method according to claim 1 wherein the residual solvent from said remaining withdrawn oil-rich liquid is recovered by countercurrently washing the oil-rich liquid in liquid phase with a stream of water thereby forming a solution of residual solvent in water, the resulting solution in water is countercurrently washed in liquid phase with a stream of feed oil to form a mixture of feed oil and residual solvent which last mentioned mixture is passed to the extraction zone.

4. The method according to claim 1 in which the primary distillates and recycled water-solvent azeotrope are commingled prior to condensation of said distillates.

5. The method according to claim 1 in which the settling zone is maintained at about 70 to 100° F.

6. The method according to claim 1 in which a portion of withdrawn solvent-rich liquid is recycled directly to the extraction zone.

DAVID K. BEAVON.

REFERENCES CITED

The following references are of record in the file of this patent:

UNITED STATES PATENTS

| Number | Name | Date |
|---|---|---|
| 2,030,284 | Diggs | Feb. 11, 1936 |
| 2,038,798 | Manley | Apr. 28, 1936 |
| 2,154,189 | Weir | Apr. 11, 1939 |
| 2,154,372 | Bosing | Apr. 11, 1939 |
| 2,167,730 | Smoley | Aug. 1, 1939 |
| 2,216,933 | Atkins | Oct. 8, 1940 |
| 2,400,802 | Arnold | May 21, 1946 |
| 2,412,823 | Mayland | Dec. 17, 1946 |
| 2,465,959 | Tindall | Mar. 29, 1949 |